United States Patent
Mote, Jr.

[19]

[11] Patent Number: 5,815,673
[45] Date of Patent: Sep. 29, 1998

[54] METHOD AND APPARATUS FOR REDUCING LATENCY TIME ON AN INTERFACE BY OVERLAPPING TRANSMITTED PACKETS

[75] Inventor: L. Randall Mote, Jr., Laguna Hills, Calif.

[73] Assignee: Samsung Electronics Co., Ltd., Seoul, Rep. of Korea

[21] Appl. No.: 609,175

[22] Filed: Mar. 1, 1996

[51] Int. Cl.[6] .................................................. H01J 13/00
[52] U.S. Cl. ........................ 395/287; 395/285; 395/286; 395/878; 395/880; 395/847; 711/167
[58] Field of Search .................................. 395/287, 290, 395/292, 298, 305, 285, 286, 878, 881, 309, 800, 672, 674, 284, 800.29, 800.31, 800.32, 800.33, 800.36, 847, 856–857; 711/167, 169

[56] References Cited

U.S. PATENT DOCUMENTS

| | | | |
|---|---|---|---|
| 4,677,544 | 6/1987 | Kinoshita | 395/287 |
| 4,803,621 | 2/1989 | Kelly. | |
| 4,914,653 | 4/1990 | Bishop et al.. | |
| 4,937,791 | 6/1990 | Steele et al. | 395/800 |
| 5,230,067 | 7/1993 | Buch | 395/821 |
| 5,440,749 | 8/1995 | Moore et al. | 395/800 |
| 5,499,385 | 3/1996 | Farmwald et al. | 395/823 |
| 5,548,797 | 8/1996 | Arimilli et al. | 395/880 |
| 5,598,581 | 1/1997 | Daines et al. | 395/872 |
| 5,606,717 | 2/1997 | Farmwald et al. | 395/856 |
| 5,623,638 | 4/1997 | Andrade | 395/494 |
| 5,649,175 | 7/1997 | Kanekal et al. | 395/551 |

*Primary Examiner*—Ayaz R. Sheikh
*Assistant Examiner*—Raymond N. Phan
*Attorney, Agent, or Firm*—Knobbe, Martens, Olson & Bear, LLP

[57] ABSTRACT

Customized circuitry implemented on the transmitting end of an interchip communication bus reduces the number of clock cycles required to transmit control packets over the interchip communication bus. The packet transaction protocol is predicated upon the relationship between consecutive command words sent over the interchip bus so that, if consecutive words at a packet boundary contain the same data, this data can be saved as separate command words by the receiving chip within a single clock cycle. This is accomplished through the generation of a synchronization signal whenever a new packet is started. In a preferred embodiment, bit patterns for the first and/or last word of a packet which are found to be statistically more prevalent are intentionally juxtaposed to increase the probability of consecutive command words having the same information.

12 Claims, 4 Drawing Sheets

5,815,673

METHOD AND APPARATUS FOR REDUCING LATENCY TIME ON AN INTERFACE BY OVERLAPPING TRANSMITTED PACKETS

BACKGROUND OF THE INVENTION

1. Field of the Invention

The present invention relates to a method and apparatus for reducing the total number of clock cycles to transmit data over an interchip bus.

2. Description of the Related Art

In order to transmit control and synchronization information between chips on, for example, a motherboard, relatively small interchip buses (e.g., four-bit control buses) are employed in many applications. For example, a chip set for use with a microprocessor may be more conveniently fabricated as a pair of integrated circuit (IC) chips wherein the first chip receives address and control signals from the processor bus while the other chip receives data signals from the processor bus. The first chip controls the data transfers on the second chip via the interchip bus.

A conventional control signal transmission protocol is typically used in conjunction with such interchip buses to provide for the transfer of control signals from a transmitting chip to one or more receiving chips. According to the conventional protocol, commands sent via the interchip control bus are transmitted in packet form wherein each command packet includes one or more command words preceded by a preamble word and a packet type code word. The transfer of the control signals is synchronized by a sync signal. When no command data is being transferred over the interchip command bus, an idle word is typically asserted over the bus until a new command packet is sent.

Whenever command signals are to be transferred from a transmitting chip to a receiving chip over the interchip bus, the transmitting chip first must drive the packet start command word out onto the bus. A sync signal is then generated in order to indicate that the data on the bus represents the start of a valid command packet. The sync signal is typically sent in the same clock cycle as the packet start word. A preamble is sometimes sent in the clock cycle before the packet start word. Thus, the receiving chip must first save the preamble before responding to the command. It can then be seen that one additional clock cycle is required at the beginning of each packet to send the preamble prior to sending the remainder of the command packet.

SUMMARY OF THE INVENTION

The inventor of the present invention has recognized that communication latency times can be reduced by overlapping command packets which are sent over an interface. Under one aspect, the preferred embodiment of the invention is a method of reducing the number of clock cycles required for communication of information packets over an interchip communication bus. The interchip communication bus is connected between a transmitting chip and a receiving chip. The method comprises the steps of: outputting a first information word over the interchip bus in a first time interval; registering the first information word within the transmitting chip in the first time interval, so that the first information word is available during a second consecutive time interval; receiving the first information word at the receiving chip in the first time interval; registering the first information word at the receiving chip in the first time interval, so that the first information word is available during a second consecutive time interval; generating a second information word within the transmitting chip within the second time interval; comparing the registered first information word with the second information word within the transmitting chip during the second time interval; and if the registered first information word is the same as the second information word, outputting a third information word over the interchip bus in place of the second information word during the second time interval. The third information word is transmitted in a third time interval immediately following the second time interval if the registered first information word is not the same as the second information word.

In a preferred embodiment, the first information word is defined so as to increase the probability that the first information word will be the same as the second information word.

In another preferred embodiment, the first information word comprises a command word or an idle word, the second information word comprises a preamble to a command packet transaction, and the third information word comprises a packet type code.

In still another preferred embodiment, each time interval is one clock period in duration.

In an alternative embodiment, each time interval is multiple clock periods in duration.

Under a further aspect the preferred embodiment of the invention comprises an apparatus for saving clock cycles during information packet transactions on an interchip bus. The apparatus comprises a select circuit having an output and first and second inputs. The output communicates with the interchip bus, and the select circuit selects one of the first and second inputs as an output in response to a select signal. The apparatus further comprises a temporary storage circuit in communication with the output of the select circuit which stores a first information word output onto the interchip bus during a first time interval; and a comparator circuit having a first input in communication with the first input of the select circuit and a second input in communication with the temporary storage circuit. The comparator circuit compares the first information word stored within the temporary storage circuit with a second information word on the first input of the select circuit during a second time interval. The comparator circuit further causes a third information word on the second input of the select circuit to be output in place of the second information word by the select circuit during the second time interval when the first and second information words contain substantially the same information.

In a preferred embodiment, the select circuit comprises a multiplexer, and the temporary storage circuit comprises a register.

In a still further embodiment, the comparator circuit causes the third information word on the second input of the select circuit to be output by the select circuit when the first and second information words have an identical bit pattern.

In another preferred embodiment, each the time interval is one clock period in duration or, alternatively, each time interval is multiple clock periods in duration.

Under still another aspect, the preferred embodiment of the invention is an apparatus for reducing the number of clock cycles required to complete a data transaction over an interchip bus. The apparatus comprises means for selecting an output from first and second inputs. The output communicates with the interchip bus. The apparatus further comprises means for storing a first information word during a first time interval. The means for storing is in communication with the output of the means for selecting. Finally, the apparatus comprises means for comparing the first information word stored within the means for storing with a second information word on the first input of the means for selecting during a second time interval. The means for comparing causes a third information word on the second input of the means for selecting to be output in place of the second information word by the means for selecting during the second time interval when the first and second information words contain substantially the same information.

DETAILED DESCRIPTION OF THE PREFERRED EMBODIMENT

Figure 1:
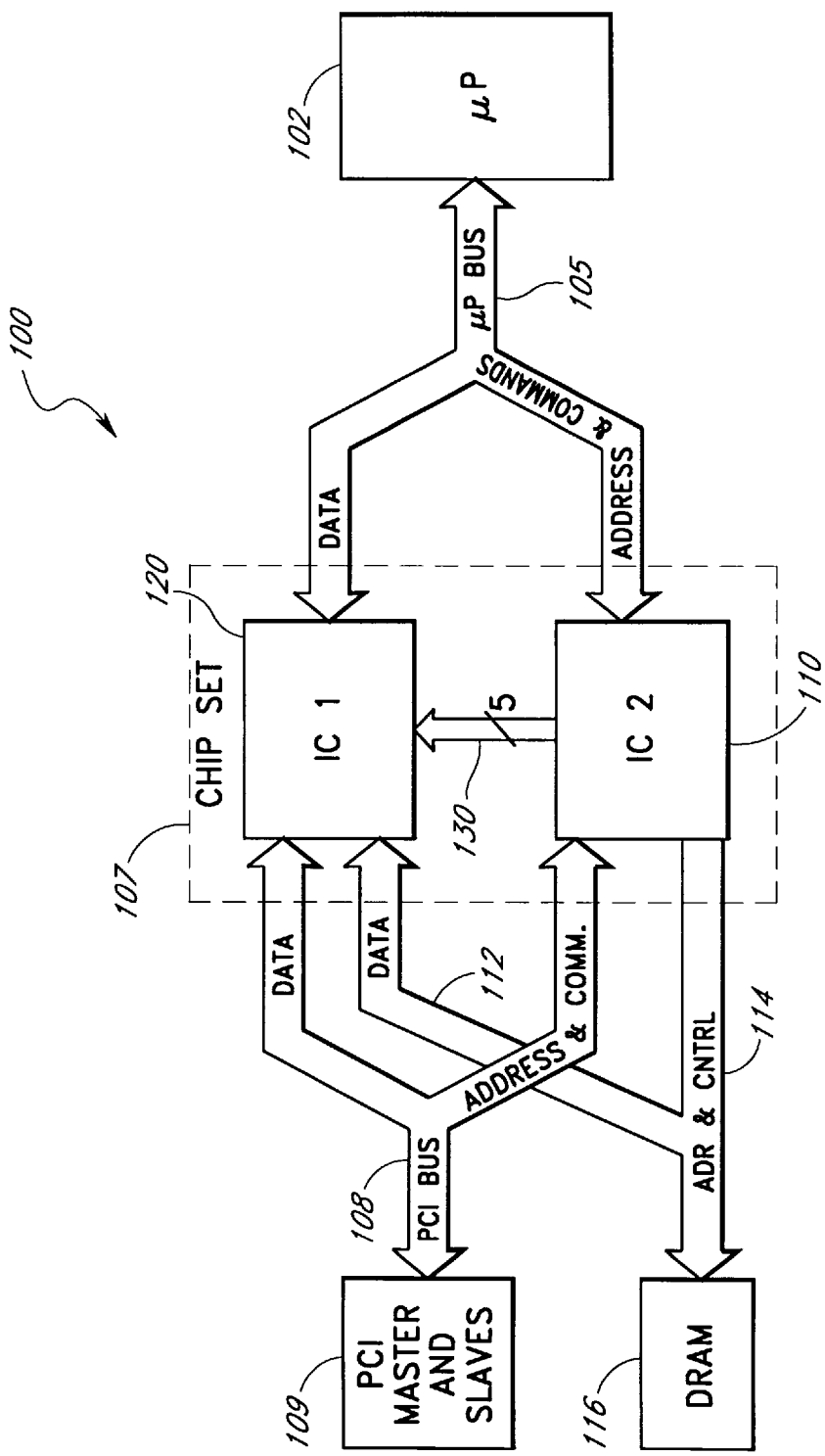
FIG. 1 is a simplified block diagram of a computer system including integrated circuit chips connected by an interchip command bus.

FIG. 1 is a simplified schematic block diagram of an exemplary computer system 100 into which the present invention may be incorporated. The computer system 100 includes a microprocessor 102 which communicates with a chip set 107 via a microprocessor bus 105. The chip set 107 communicates with a PCI master and slaves 109 via a PCI bus 108. In addition, the chip set 107 communicates with a memory (e.g., a DRAM) 116 via data and address and control portions 112, 114 of a memory bus, so that the chip set 107 acts as a microprocessor bus-to-memory bus bridge in the computer system 100. Of course, it will be appreciated by those of skill in the art that the computer system 100 illustrated in FIG. 1 is highly simplified for purposes of clarity in illustrating the present invention.

The chip set 107 is shown to include a pair of integrated circuit (IC) chips 110, 120 connected by an interchip communication bus 130 on the motherboard within the computer system 100. In one embodiment the interchip communication bus 130 comprises a five-bit control bus which is used to transfer command signals from the transmitting chip 110 to a receiving chip 120. The five-bit control bus actually includes five lines in one embodiment, where four lines are reserved for command words and the fifth line is reserved for the synchronization signal. It will be appreciated by those of ordinary skill in the art that a four-bit bus is convenient for one embodiment of the invention, while smaller or larger buses may be used as called for by other specific applications. In this embodiment, the chip set 107 is divided into two chips because the number of pins required to connect the chip set 107 with the PCI bus 108 and the microprocessor bus 105 would be cost prohibitive on a single integrated circuit. The IC 120 of the chip set 107 receives data lines from the microprocessor bus 105, while the IC 110 of the chip set 107 receives address and control lines from the microprocessor bus 105. As with the microprocessor bus 105, data signals on the PCI bus 108 are transmitted to and from the chip 120 within the chip set 107, while address and command signals are transmitted to and from the IC 110. Similarly, address and control information are exchanged between the memory 116 and the IC 110 via the bus 114, while data information is exchanged between the memory 116 and the IC 120 via the bus 112.

In operation, the microprocessor 102 transmits data, address, and command signals to and from the other systems on the motherboard. The chip set 107 acts as a microprocessor to memory bridge so that the data, address, and commands transferred from the microprocessor 102 are able to be efficiently communicated to the memory 116 and the PCI master and slaves 109 over the memory bus portions 112, 114 and the PCI bus 108, respectively. Likewise, the chip set 107 acts as an interface for signals transferred from the PCI master and slaves 109 to the microprocessor 102 and the memory 116 via the microprocessor bus 105 and the memory busses 112, 114. Command signals are transferred from the IC 110 to the IC 120. The IC 110 receives address and command signals from the microprocessor bus 105 and the PCI bus 108, while the IC 120 receives the data signals from the microprocessor bus 105, the data portion 112 of the memory bus and the PCI bus 108.

Figure 2:
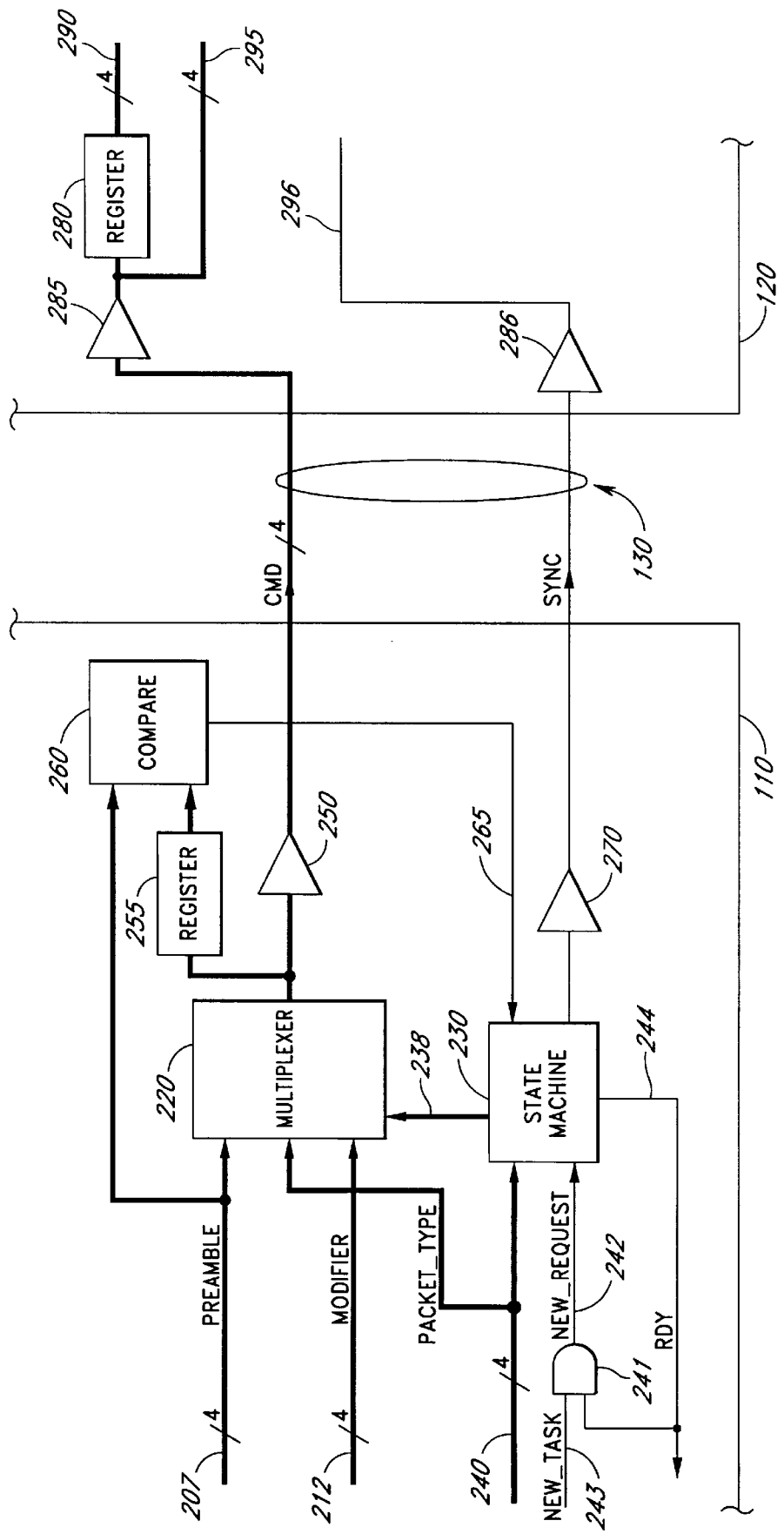
FIG. 2 is a simplified block diagram of a portion of the internal circuitry of the transmitting chip of FIG. 1, which illustrates the mechanism of the present invention for saving clock cycles along the interchip communication bus.

FIG. 2 is a simplified block diagram of portions of the internal circuitry of chips 110 and 120 which illustrate the circuitry used in one preferred embodiment of the invention to save clock cycles during data transfers along the interchip communication bus 130. As shown in FIG. 2, a multiplexer circuit 220 selects packet data to be sent over the interchip bus 130.

A PREAMBLE input 207, a PACKET_TYPE input 240, and a MODIFIER input 212 of the packet serve as separate inputs to a multiplexer circuit 220. The multiplexer circuit 220 selects each input 207, 240 and 212 as needed to form each command packet to be sent over the interchip bus 130. The output of the multiplexer 220 is under the control of a state machine 230 via a select bus 238.

The state machine 230 receives the PACKET_TYPE input via the bus 240, and receives a NEW_REQUEST input via a line 242. The PACKET_TYPE input indicates the kind of data which is to be transferred over the interchip bus 130, while the NEW_REQUEST input 242 indicates that the receiving chip 120 is ready to receive the PREAMBLE for the next command packet. The NEW_REQUEST line 242 connects to the output of an AND gate 241. The AND gate 241 receives a first input via a line 243. The bus 240 and the line 243 communicate with circuitry internal to the IC 110. The state machine 230 also outputs a ready-for-next-packet signal, RDY, via a line 244 to the circuitry within the IC 110, which indicates that the state machine 230 is prepared to receive and process the next command packet from the circuitry within the IC 110. The line 244 serves as a second input to the AND gate 241.

The output of the multiplexer 220 communicates with the control bus 130 via a driver 250. Additionally, the output of the multiplexer 220 communicates with a register 255. The output of the register 255 serves as a first input to a comparison circuit 260. In addition, the input of the PREAMBLE 207 is provided as a second input to the comparison circuit 260. The output of the comparator 260 is supplied as a PREAMBLE_SENT input to the state machine 230 via a line 265. The state machine 230 further provides a synchronization output, SYNC, via a driver 270.

The receiving chip 120 is shown in FIG. 2 to include a receiving register 280 which holds (i.e., delays) the previous clock's data from the interchip bus 130. Delayed data on bus 290 and the buffered interchip data on a bus 295 and a line 296 communicate with circuitry internal to the chip 120, so that the data serve as control inputs to circuitry within the receiving chip 120.

In operation, once the state machine 230 asserts the RDY signal 244, indicating that the state machine 230 is capable of processing the next packet, and the circuitry within the chip 110 asserts a NEW_TASK signal over the line 243, a NEW_REQUEST signal is asserted over the line 242 indicating that the PREAMBLE, PACKET_TYPE and MODIFIER for the next command packet are available to be output over the interchip bus 130.

The multiplexer 220 selects one of the PREAMBLE input, PACKET_TYPE input, or the MODIFIER input under the control of the state machine 230 via the select bus 238. The PREAMBLE data may include, for example, a buffer number into which data is to be transferred within the IC 120. The MODIFIER, on the other hand, comprises the control data which is to be transferred into the buffers within the receiving IC chip 120. The PACKET_TYPE includes information relating to the command being sent. In one embodiment, the PACKET_TYPE identifies the command type (i.e., read PCI, write memory, etc.). In a further embodiment, the PACKET_TYPE defines the packet length (i.e., whether it includes a PREAMBLE and a number of MODIFIERS to be expected). In one preferred embodiment, the most common operations correspond to the shortest packets, and in a still further preferred embodiment, the receipt time of the PACKET_TYPE is an indicator to the receiving IC chip 120 that it is to begin or end a process.

The output of the multiplexer 220 is driven onto the control bus 130 via a driver 250. The data present on the interchip bus 130 are subsequently registered into the register 280 at the occurrence of the next clock cycle. Additionally, the output is registered within the register 255 for a one clock cycle duration. In the time period which is required to register the output of the multiplexer 220 within the register 255, another signal is output by the multiplexer 220 to be driven out over the interchip bus 130 via the driver 250.

Within the same clock cycle that the register 280 clocks in the data on the interchip bus 130, the output of the register 255 is compared to the PREAMBLE input 207. That is, the PREAMBLE is provided as a first input to the comparison circuit 260, while the one-clock-cycle delayed output of the register 255 is provided as a second input to the comparison circuit 260 so that the PREAMBLE and the previous clock cycle's packet command word output onto the control bus 130 are compared within the comparison circuit 260. If the PREAMBLE is the same as the data stored within the register 255, then a PREAMBLE_SENT signal is asserted by the compare circuit 260 and is provided as control input to the state machine 230 via the line 265.

When the state machine 230 receives a NEW_REQUEST signal, 242, and the comparison (i.e., the PREAMBLE_SENT) is valid over the line 265, signifying that the previous clock cycle's interchip bus command word and the new packet's PREAMBLE to be output over the interchip bus 130 are the same, then a SYNC signal is asserted from the state machine 230 via the driver 270 and the PACKET_TYPE is selected instead of the PREAMBLE for transmission over the interchip bus 130 via the select bus 238. If PREAMBLE_SENT is not active on line 265 when the state machine 230 receives a NEW_REQUEST signal on the input 242, and the PACKET_TYPE on the input 240 is a type recognized by the state machine 230 which requires a PREAMBLE in its command packet, then the state machine 230 selects the PREAMBLE 207 via the select bus 238 for output by the multiplexer 220 over the interchip bus 130.

Whenever a SYNC pulse is output over the line 271 via the driver 270, a PACKET_TYPE will be present on the interchip bus 130. The SYNC pulse is received by the chip 120 as a control signal which indicates that a data packet transaction has commenced. Upon receiving the SYNC pulse, the circuitry within the IC chip 120 interprets the data stored within the register 280 as the PREAMBLE to the data packet transaction, while the data presently on the bus 295 is interpreted as the PACKET_TYPE. Thus, since the data in the register 280 are the same as the data in the register 255 (because both registers store the data which were applied to the interchip bus 130 in the previous clock cycle), and since the data in the register 255 are the same as the PREAMBLE, it follows that the data in the buffer 285 will be the same as the PREAMBLE. In this manner, the PREAMBLE of a new packet need not be sent if the data in the new PREAMBLE are the same as the interchip bus' IDLE pattern, or are the same as the last word of the previous packet, thus saving clock cycle in the overall data transaction.

Figure 3A:
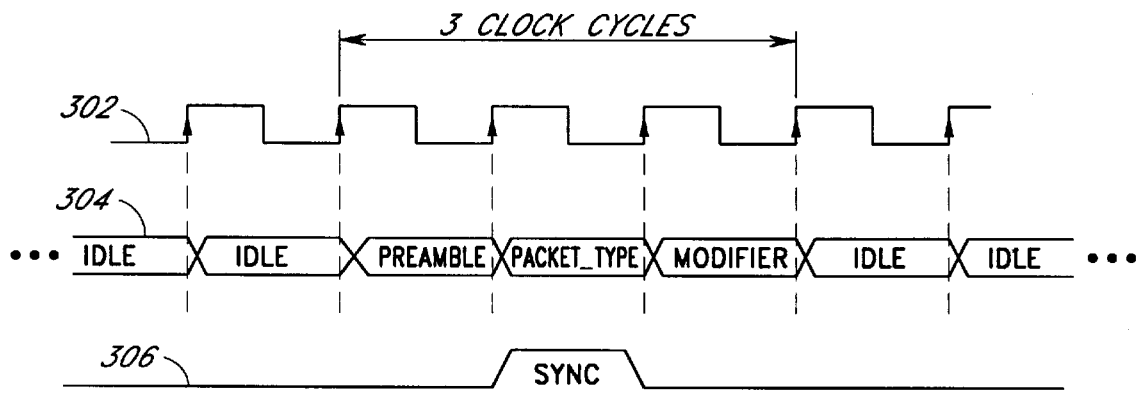
FIGS. 3A–3C are timing diagrams which show the effective transmission times for command packets sent over the interchip communication bus and which illustrate the advantages of the present invention.
Figure 3B:
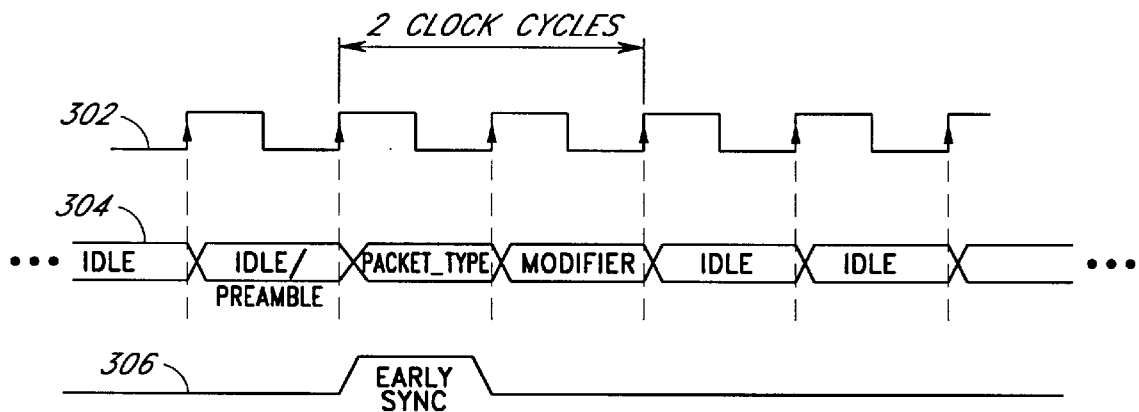
Figure 3C:
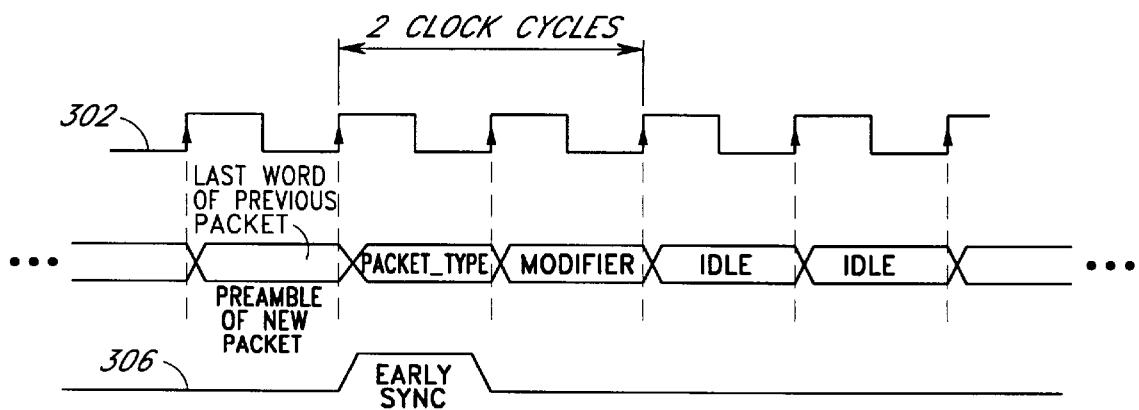

FIGS. 3A through 3C are timing diagrams which more clearly illustrate the method by which clock periods are saved in accordance with the teachings of the present invention. FIG. 3A shows conventional signal timing on an interchip bus wherein the advantages of the present invention are not incorporated. A first signal 302 represents a synchronous clock which is used to clock packet data words within the IC chips 110, 120, while a signal 304 represents the packet data word signals present on the four-bit CMD portion of the interchip bus 130 (i.e., other than the signal present on the SYNC line). Finally, a signal 306 represents the SYNC signal transmitted over the interchip bus 130. Each packet CMD word output onto the interchip bus 130 is present for the duration of an entire clock period. Consequently, as many clock periods are required as there are CMD words in the packet to communicate between the transmitting IC chip 110 and the receiving IC chip 120.

For example, as shown in FIG. 3A, the interchip bus 130 is idle for two clock periods until the application of a PREAMBLE (e.g., the buffer number which identifies the buffer to which the data in the subsequent transaction is to be transferred) within the next clock cycle. The following clock cycles are used to transfer the PACKET_TYPE (indicating, among other things, the type of command) and a MODIFIER word (which further defines the command).

Beginning with the output of the PREAMBLE word shown in FIG. 3A, a total of three clock cycles occur until the last MODIFIER word is output onto the interchip bus 130. When it is determined that the PACKET_TYPE following the PREAMBLE has been asserted on the interchip bus 130, the SYNC signal 306 is asserted to indicate the presence of the new packet. As briefly discussed above, the SYNC alerts the receiving chip 120 that the PREAMBLE and the PACKET_TYPE have been received on busses 290 and 295. The receiving chip 120 thereafter interprets the data which are subsequently on the bus 295 as the remaining CMD words (if any) in the CMD packet. For example, in the case where one MODIFIER word follows the PACKET_TYPE, as shown in FIG. 3A, the PACKET_TYPE indicates that the next CMD word belongs to the same CMD packet so that the receiving chip 120 reads the CMD word on the bus 295 in the following clock cycle as the expected MODIFIER data.

FIG. 3B illustrates one method whereby the teachings of the present invention result in a one-clock cycle savings over the conventional protocol shown in FIG. 3A. Specifically, the inventor has recognized that, by considering the relationship between the CMD words transferred over the interchip bus, multiple CMD words may be issued to the receiving IC chip within a single clock cycle duration. In particular, as illustrated in FIG. 3B, a total of two clock cycles occur from the end of the last idle word until the last MODIFIER word is output onto the interchip bus 130. Only two clock cycles occur because the PREAMBLE need not be sent in the case where the PREAMBLE is the same as the idle word. As described above with reference to FIG. 2, a comparison is made between the PREAMBLE and the CMD word previously sent on the interchip bus 130. If the PREAMBLE is the same as the preceding CMD word (i.e., the idle word in this case) then the PACKET_TYPE word, together with SYNC asserted, is sent out in place of the PREAMBLE. In this manner, an early SYNC is asserted so that the CMD packet requires only two clock cycles to complete. Determining that the idle word is the same as the PREAMBLE means that the data in the register 280 are the same as the PREAMBLE because the receiving chip 120 also registers the previous IDLE word into the register 280. Thus, the receiving chip 120 will operate as if the PREAMBLE was sent in the previous clock cycle. In this manner, the PREAMBLE can be replaced by the idle word which was transmitted prior to the clock cycle in which the PREAMBLE was to be transmitted. Consequently, the PREAMBLE can be replaced by the PACKET_TYPE to save a clock cycle in the overall CMD packet. That is, it is not necessary to transfer the buffer number indicated by the PREAMBLE 207 (see FIG. 2) onto the bus 130 because the idle word already present on the bus 130 was used to replace the buffer number. Therefore, the state machine 230 controls the multiplexer 220 to select the PACKET_TYPE instead of the buffer number so that during the next clock period the receiving IC chip 120 can act on both the PREAMBLE and the PACKET_TYPE.

In accordance with one aspect of the present invention, the buffer number which is most likely to be accessed is defined to have the same bit pattern as the idle word (also referred to hereinafter as the default PREAMBLE) so that, whenever this buffer is selected, the buffer number may be clocked into the register within the receiving IC chip 120 in the same clock cycle as the preceding idle word. In a particularly advantageous embodiment of the invention, the idle word code is modified to correspond to the default buffer number to increase the likelihood of a match between the PREAMBLE and the idle word. Of course, if the buffer number in the PREAMBLE is not the same as the idle word, then an additional clock cycle must occur before the buffer number can be latched into the receiving IC chip 120. However, in the case where the buffer number (which comprises the first portion of the PREAMBLE) is the same as the idle word, as depicted in FIG. 3B, the SYNC signal may be asserted immediately within the same clock cycle as the PACKET_TYPE since the idle word can serve as a replacement for the buffer number.

FIG. 3C depicts the case where consecutive CMD packets occur and where the PREAMBLE of the second CMD packet has the same bit pattern as the last CMD word of the first CMD packet. As shown in FIG. 3C, a SYNC is generated immediately after the last word of the previous CMD packet sent to the receiving chip 120. Since this last packet word has the same bit pattern as the new packet's PREAMBLE, the multiplexer 220 is caused to output the PACKET_TYPE in place of the preamble while SYNC is asserted. Consequently, only two clock cycles transpire from the end of the first CMD packet to the end of the second CMD packet. If, on the other hand, the PREAMBLE had been sent separately (rather than using the last word of the first packet as the PREAMBLE), three clock cycles would have been necessary to complete the second CMD packet.

Since the first CMD packet's content defined that packet's length, the receiving IC chip 120 has no difficulty in determining when the last CMD word is present on 295. Furthermore, once an asserted SYNC is received by the chip 120, the information contained within the register 280 is considered by the chip 120 to be the PREAMBLE of the new CMD packet. Thus, the information on the bus 295 is used twice by the receiving chip 120—once on the previous clock as the last word of the first CMD packet (sampled on bus 295) and once as a PREAMBLE for the second CMD packet (sampled on bus 290).

A more detailed description of the operation of the circuitry within the IC chip 110 for the case illustrated in FIG. 3C is set forth below. Specifically, when the last CMD word of the first CMD packet has been output from the multiplexer 220, this CMD word is registered within the register 255 and is compared to the subsequent PREAMBLE provided to the comparator circuit 260 of the bus 207. If it is determined within the comparator circuit 260 that the PREAMBLE word is the same as the preceding CMD word, then the comparison signal is generated over the line 265 and is applied to the state machine 230 so that the state machine 230 causes the multiplexer 220 to output the PACKET_TYPE rather than the PREAMBLE. At the same time, the state machine 230 asserts SYNC for one clock period via the driver 270. Thus, the last CMD word of the first CMD packet serves as the buffer number of the second CMD packet. In this manner, a clock cycle is saved during the consecutive packet transmissions.

Figure 4:
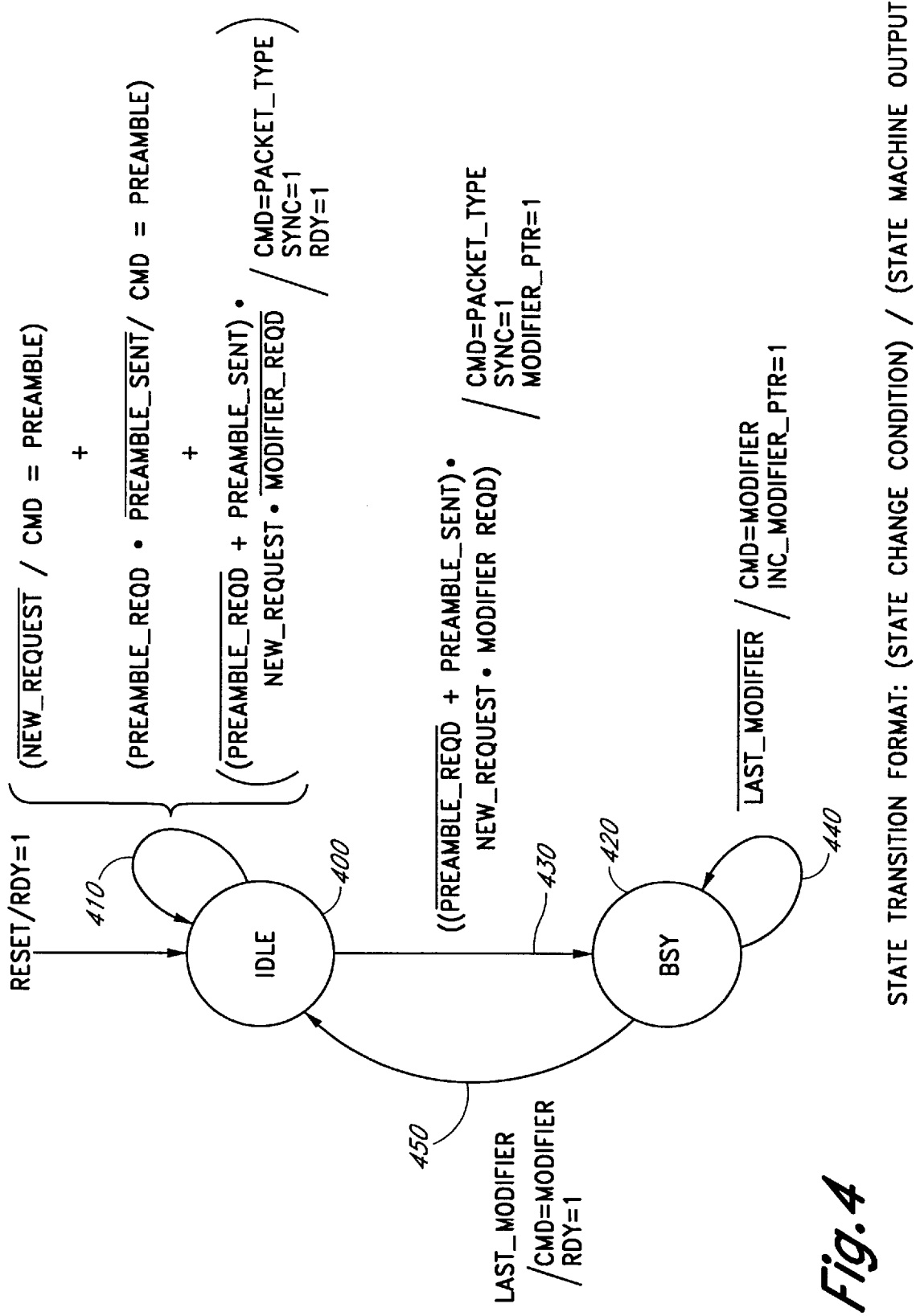
FIG. 4 is a state diagram which represents the operation of the state machine of FIG. 2 with respect to the generation of an early preamble in accordance with the teachings of the present invention.

FIG. 4 is a state diagram which represents the operation of the state machine 230 with respect to the generation of an early PREAMBLE in accordance with the teachings of the present invention. In practice, the state machine 230 will also provide for control of other elements within the transmitting chip 110, but for purposes for clarity in illustrating the present invention, this functionality of the state machine 230 is not represented in the simplified state diagram of FIG. 4.

Upon the initiation of a RESET, the state machine 230 enters an IDLE state 400. When the state machine 230 is in the IDLE state 400, this indicates that the state machine 230 is ready to receive additional CMD packets for output over the four-bit CMD bus 130. The state machine 230 remains in the IDLE state 400 under three different conditions, as represented by a state transition path 410 which returns to the IDLE state 400.

Under a first condition, when a NEW_REQUEST signal (i.e., the signal applied on the line 242) is not asserted, then the state machine 230 remains in the IDLE state 400, and the multiplexer 220 outputs the default PREAMBLE as a command over the four-bit CMD bus portion of the bus 130. That is, when a new request has not been made, then the state machine 230 selects the PREAMBLE 207 for output for the CMD bus 130 via the multiplexer 220 and the driver 250. The PREAMBLE is advantageously set equal to the most commonly accessed buffer so there is a higher likelihood the next actual PREAMBLE is equal to the data which were sent on the previous clock cycle.

Another condition under which state machine 230 remains in the IDLE state 400 is when a PREAMBLE_REQD signal is asserted (indicating to the state machine 230 that a PREAMBLE is required for the new CMD packet which is to be transmitted over the CMD bus 130) and the PREAMBLE_SENT signal is inactive (i.e., indicating that the CMD word sent on bus 130 in the previous clock period was not equal to the PREAMBLE on the bus 207). Thus, because a PREAMBLE is required and because the CMD word on the command bus 130 in the previous clock cycle will not serve as the appropriate PREAMBLE, the state machine 230 issues a select signal to the multiplexer 220 over the line 238 which allows the PREAMBLE on the bus 207 to propagate onto the CMD bus 130. Thus, the issued CMD word is equal to the PREAMBLE.

The final condition under which the state machine 230 remains in the IDLE state 400 is when: 1) the PREAMBLE_REQD signal is not asserted, or the PREAMBLE_SENT signal is asserted; and 2) the NEW_REQUEST signal is asserted while the MODIFIER_REQD signal is deasserted. That is, since 1) a PREAMBLE is not required, or the CMD word on the bus 130 in the previous clock cycle is equal to the PREAMBLE which is to be sent; and 2) the new packet being requested has no MODIFIER words, this indicates that, if the current packet required a PREAMBLE, this PREAMBLE was already issued on the previous clock period, and that the current packet ends with the current PACKET_TYPE CMD word. Consequently, the state machine 230 is capable of accepting a new packet for transfer over the CMD bus 130 in the next clock period. Thus, the state machine 230 remains in the IDLE state 400.

Under this last condition where the state machine 230 remains within the IDLE state 400, the state machine 230 causes the PACKET_TYPE to be sent over the CMD bus 130 via the multiplexer 220 and the driver 250. In addition, the SYNC signal is asserted via the driver 270, while the RDY signal is also asserted over the line 244.

The state machine 230 transitions from the IDLE state 400 to a BSY (busy) state 420 via a transition path 430 whenever it is determined that: 1) either a PREAMBLE is not required, or the CMD word on bus 130 in the previous clock cycle was equal to the PREAMBLE which is to be sent; and 2) a new request has been made which requires MODIFIER words. That is: 1) if the PREAMBLE_REQD signal is not asserted, or the PREAMBLE_SENT signal is asserted; and 2) if the NEW_REQUEST signal is asserted over the line 242 while the PACKET_TYPE indicates that the CMD packet contains one or more MODIFIER words, the state machine 230 transitions from the IDLE state 400 to the BSY state 420. Thus, this indicates that the PACKET_TYPE 240 is to be output over the CMD bus 130 via the multiplexer 220 and the driver 250 while the SYNC signal is also asserted via the driver 270. In addition, the MODIFIER_PTR (which is a value loaded in a counter to count the number of MODIFIER words after the PACKET_TYPE of the current packet) is set equal to one. The state machine 230 transitions to the BSY state (i.e., a state where the state machine 230 is unable to process a new request until the current packet transfer is complete).

The state machine 230 remains in the BSY state 420, as represented by a transition path 440, while a LAST_MODIFIER signal is not asserted (i.e., while the signal which indicates that the packet's last CMD word has been output onto the CMD bus 130 is not true). Each time a transition is made along the path 440, the next CMD word (i.e., the next MODIFIER word from bus 212) is propagated onto the command bus 130 via the multiplexer 220 and the driver 250. In addition, the MODIFIER_PTR is incremented until the last MODIFIER word of the current packet is reached. Once the last word of the packet has been propagated onto the bus 130, the state machine 230 transitions from the BSY state 420 back to the IDLE state 400 via a state transition path 450. As indicated in FIG. 4, the transition along the path 450 occurs when the LAST_MODIFIER signal is asserted. This causes the MODIFIER word output onto the CMD bus 130 to equal to the last CMD word in the current packet, while the state machine 230 asserts the RDY signal along the line 244.

Although the present invention has been described in detail above, it should be understood that the foregoing description is illustrative and not restrictive. Those of ordinary skill in the art will appreciate that many obvious modifications can be made to the invention without departing from the spirit or central characteristics. For example, those of ordinary skill in the art will appreciate that the present invention will be most effective when implemented in conjunction with an interchip bus having fewer bits in its CMD word so that the likelihood of having identical CMD words is more significant; however, in practice busses on the order of six-bits or more could also be implemented in accordance with the present invention. Additionally, the present invention can be implemented in a word serial manner, where a packet's CMD words are sent serially over a single signal line between chips. In this case, the SYNC signal provides CMD word boundary information as well as signifying the presence of a new packet. Another implementation can reserve a unique CMD word pattern to signify the presence of the SYNC signal, thus eliminating the need for a separate SYNC line. Another implementation can include pipeline registers in either or both transmitter and receiver chips to allow higher clock rate operation. Accordingly, the scope of the invention should be interpreted in view of the following appended claims.

What is claimed is:

1. A method of reducing a number of clock cycles required for communication of information packets on an interchip communication bus, said interchip communication bus being connected between a transmitting chip and a receiving chip, said method comprising the steps of:

outputting a first information word from said transmitting chip on said interchip bus in a first time interval;

registering said first information word within said transmitting chip in said first time interval, so that said first information word is available at said transmission chip during a second consecutive time interval;

receiving said first information word at said receiving chip in said first time interval;

registering said first information word at said receiving chip in said first time interval, so that said first information word is available at said receiving chip during a second consecutive time interval;

generating a second information word within said transmitting chip within said second time interval;

comparing said registered first information word with said second information word within said transmitting chip during said second time interval; and if said registered first information word is the same as said second information word, outputting a third information word over said interchip bus in place of said second information word during said second time interval, and if said registered first information word is different from said second information word, transmitting said third information word in a third time interval immediately following transmission of said second information word in said second time interval.

2. A method as defined in claim 1, wherein said first information word is defined so as to increase a probability that the first information word will be the same as the second information word.

3. A method as defined in claim 1, wherein said first information word comprises a command word or an idle word, said second in formation word comprises a preamble to a command packet transaction, and said third information word comprises a packet type code.

4. A method as defined in claim 1, wherein each time interval is one clock period in duration.

5. A method as defined in claim 1, wherein each time interval is multiple clock periods in duration.

6. An apparatus for saving clock cycles during information packet transactions on an interchip bus, said apparatus comprising:

a select circuit having an output and first and second inputs, wherein said output communicates with said interchip bus, and wherein said select circuit selects one of said first and second inputs as an output in response to a select signal;

a temporary storage circuit in communication with said output of said select circuit which stores a first information word output onto said interchip bus during a first time interval; and a comparator circuit having a first input in communication with said first input of said select circuit, having a second input in communication with said temporary storage circuit, and having an output, said select circuit responsive to said output of said comparator circuit, wherein said comparator circuit compares said first information word stored within said temporary storage circuit with a second information word on said first input of said select circuit during a second time interval, and wherein said comparator circuit controls said select circuit via said output of said comparator circuit such that said select circuit selects a third information word on said second input of said select circuit to be output from said select circuit in place of said second information word during said second time interval when said first and second information words contain substantially the same information to thereby suppress transmission of said second information word on said interchip bus.

7. An apparatus as defined in claim 6, wherein said select circuit comprises a multiplexer.

8. An apparatus as defined in claim 6, wherein said temporary storage circuit comprises a register.

9. An apparatus as defined in claim 6, wherein said comparator circuit causes said third information word on said second input of said select circuit to be output by said select circuit when said first and second information words have an identical bit pattern.

10. An apparatus as defined in claim 6, wherein each said time interval is one clock period in duration.

11. An apparatus as described in claim 6, wherein each time interval is multiple clock periods in duration.

12. An apparatus for reducing a number of clock cycles required to complete a data transaction over an interchip bus, said apparatus comprising:

means for selecting an output from first and second inputs, wherein said output communicates with said interchip bus;

means for storing a first information word during a first time interval, wherein said means for storing is in communication with said output of said means for selecting; and means for comparing said first information word stored within said means for storing with a second information word on said first input of said means for selecting during a second time interval, wherein said means for comparing controls said means for selecting such that said means for selecting outputs a third information word on said second input of said means for selecting in place of said second information word during said second time interval when said first and second information words contain substantially the same information thereby suppressing transmission of said second information word on said interchip bus.

* * * * *

UNITED STATES PATENT AND TRADEMARK OFFICE
CERTIFICATE OF CORRECTION

PATENT NO. : 5,815,673
DATED : September 29, 1998
INVENTOR(S) : Randall L. Mote, Jr.

Page 1 of 1

It is certified that error appears in the above-identified patent and that said Letters Patent is hereby corrected as shown below:

Column 11,
Line 1, change "method a s" to -- method as --.

Signed and Sealed this

Eighteenth Day of December, 2001

Attest:

JAMES E. ROGAN
Attesting Officer        Director of the United States Patent and Trademark Office